United States Patent
Gruber

(10) Patent No.: US 9,634,778 B2
(45) Date of Patent: Apr. 25, 2017

(54) MEASUREMENT DEVICE AND MEASURING METHOD USING SIMULATED UPLINK FADING

(71) Applicant: Rohde & Schwarz GmbH & Co. KG, Munich (DE)

(72) Inventor: Ingo Gruber, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 14/768,224

(22) PCT Filed: Feb. 18, 2013

(86) PCT No.: PCT/EP2013/053180
§ 371 (c)(1),
(2) Date: Aug. 15, 2015

(87) PCT Pub. No.: WO2014/124697
PCT Pub. Date: Aug. 21, 2014

(65) Prior Publication Data
US 2015/0381294 A1    Dec. 31, 2015

(51) Int. Cl.
*H04B 17/00* (2015.01)
*H04L 5/00* (2006.01)
(Continued)

(52) U.S. Cl.
CPC ..... *H04B 17/3911* (2015.01); *H04B 17/0085* (2013.01); *H04B 17/309* (2015.01); *H04W 24/06* (2013.01)

(58) Field of Classification Search
USPC ........................................... 455/67.11, 67.14
See application file for complete search history.

(56) References Cited

U.S. PATENT DOCUMENTS

2008/0102873 A1* 5/2008 Kumar ............... H04W 52/24
455/522

FOREIGN PATENT DOCUMENTS

DE       10124371 A1    11/2002
DE    WO 2009077555 A1 *  6/2009 ............ H04W 24/06
(Continued)

OTHER PUBLICATIONS

English Translation of WO 2009077555.*

*Primary Examiner* — Nay A Maung
*Assistant Examiner* — Erica Fleming-Hall
(74) *Attorney, Agent, or Firm* — Potomac Technology Law, LLC

(57) ABSTRACT

A measuring device for measuring a reaction of a device under test to an uplink channel quality parameter, indicating a quality of a transmission channel from the device under test to the measuring device, comprises signal generation means, set up for generating a first signal including the uplink channel quality parameter. The uplink channel quality parameter is set by the signal generation means independent from an actual channel quality of the transmission channel. Transmission means is set up for transmitting a second signal, which is derived from the first signal or is identical to the first signal to the device under test. Receiving means is set up for receiving a third signal transmitted by the device under test and created by the device under test based upon the uplink channel quality parameter and for determining the reaction of the device under test to the uplink channel quality parameter.

12 Claims, 3 Drawing Sheets

(51) Int. Cl.
*H04W 24/08* (2009.01)
*H04B 17/391* (2015.01)
*H04W 24/06* (2009.01)
*H04B 17/309* (2015.01)

(56) References Cited

FOREIGN PATENT DOCUMENTS

DE            EP 2262134 A2 * 12/2010  ......... H04B 17/0087
EP                  2262134 A2    12/2010
WO     WO2009077555 A1    6/2009

* cited by examiner

MEASUREMENT DEVICE AND MEASURING METHOD USING SIMULATED UPLINK FADING

CROSS-REFERENCE TO RELATED APPLICATION(S)

The present application is a national phase application of PCT application No. PCT/EP2013/053180 (filed 2013 Feb. 18), the entirety of which is incorporated herein by reference.

FIELD

The invention relates to a measuring device and a measuring method for measuring a reaction of a device under test to an uplink channel quality parameter.

BACKGROUND

Network providers have the need of testing mobiles under varying channel conditions. Only mobiles fulfilling certain constraints are delivered to customers. In order to avoid expensive real-world-measurements, these tests are performed in the laboratory. In order to simulate varying channel conditions, a channel simulator is used. The use of radio frequency faders is known. Such a radio frequency fader though is very expensive.

Alternatively, a baseband-simulator can be used. A radio frequency fader is advantageous since it is inserted into a path between the measurement and the device under test just as a transmission channel is in real-world measurement. A baseband-fader is advantageous since it is significantly less expensive and since the digital processing of the baseband-fader allows very easily reproducible measurement results. Typically though, baseband-faders can only be used on the downlink transmission channel, which corresponds to the transmission channel from the measurement device to the device under test. The uplink transmission channel, which corresponds to the transmission channel from the device under test to the measurement device, though is unchanged.

In most cases, this does not pose a problem since degrading the transmission channel from the device under test to the measurement device would only test the receiver of the measurement device, but not the device under test. Anyway, a demand exists for testing devices under test with activated uplink-fading. This is due to the need of the network providers to test the reaction of the device under test to the changed transmission conditions by adapting the modulation scheme, the coding scheme, the packet length, or the communication standard used by the device under test. Also a reaction of the device under test to data packets not received properly is a parameter in need of testing. Moreover, an overall data throughput under varying conditions is a parameter in need of testing.

The German patent application DE 101 24 371 A1 shows a measurement device comprising a baseband-fader as described earlier.

What is needed, therefore, is an approach for measuring the reaction of a device under test to changing uplink channel quality without requiring expensive hardware.

SOME EXAMPLE EMBODIMENTS

Accordingly, embodiments of the present invention advantageously address the foregoing requirements and needs, as well as others, by providing a measurement device and a measurement method for measuring the reaction of a device under test to changing uplink channel quality without requiring expensive hardware.

In accordance with example embodiments, an inventive measuring device, for measuring a reaction of a device under test to an uplink channel quality parameter, indicating a quality of a transmission channel from the device under test to the measuring device, comprises signal generation means, a transmission means, and a receiving means. The signal generation means is set up for generating a first signal including the uplink channel quality parameter. By way of example, the uplink channel quality parameter is set by the signal generation means independent from an actual channel quality of the transmission channel from the device under test to the measuring device. The Transmission means is set up for transmitting a second signal, which is derived from the first signal or is identical to the first signal to the device under test. The Receiving means is set up for receiving a third signal transmitted by the device under test and created by the device under test based upon the uplink channel quality parameter and for determining the reaction of the device under test to the uplink channel quality parameter. This allows a measurement of the reaction of the device under test without performing an actual fading of the uplink channel.

The reaction of the device under test measured by the measuring device may comprise one or more of a change of modulation scheme, a change of coding scheme, a change of packet length, a data throughput reached by the device under test, and a change of a communication standard used by the device under test. A plurality of different reactions can therefore be measured.

According to one such embodiment, the first signal is an analog high frequency signal ready for transmission. In this case, by way of example, the transmission means is set up for receiving an analog fourth signal derived from the first signal and transmitting it as analog second signal. This allows for a very accurate fading of the signal. Alternatively, according to a further embodiment, the first signal is a digital signal. In this case, by way of example, the transmission means is set up for receiving a digital fourth signal derived from the first signal and for converting the fourth signal into the analog second signal and transmitting it. This allows for the use of a simple baseband fader.

According to a further embodiment of the device, the signal generation means is set up for generating the first signal such that it indicates to the device under test that at least one packet of a prior transmission of the device under test was lost. In this case, the receiving means is set up for determining the reaction of the device under test to the lost packet. This allows for an even more accurate test of the reaction of the device under test.

According to further embodiments, the measuring device further comprises fading means, set up for performing a fading of the first signal and thereby generating a signal, the second signal is derived from. Moreover it comprises downlink channel quality parameter determination means, set up for reading out from the third signal a downlink channel quality parameter generated by the device under test based upon a quality of a transmission channel from the measurement device to the device under test. In this case, by way of example the signal generation means are set up for setting the uplink channel quality parameter as identical to the downlink channel quality parameter. This allows for a very simple and reproducible creation of the channel quality parameter transmitted to the device under test. By way of further example, the signal generation means are set up for setting the uplink channel quality parameter to a pre-specified value. This allows for a very accurate parameter generation.

In accordance with example embodiments, an inventive measuring method serves the purpose of measuring a reaction of a device under test to an uplink channel quality parameter, indicating a quality of a transmission channel from the device under test to the measuring device. The method comprises the following steps:

generating a first signal including the uplink channel quality parameter, wherein the uplink channel quality parameter is set by the signal generation means independent from an actual channel quality of the transmission channel from the device under test to the measuring device;

transmitting a second signal, which is derived from the first signal or is identical to the first signal to the device under test, receiving a third signal transmitted by the device under test and created by the device under test based upon the uplink channel quality parameter, and determining the reaction of the device under test to the uplink channel quality parameter.

This allows a measurement of the reaction of the device under test without performing an actual fading of the uplink channel.

BRIEF DESCRIPTION OF THE DRAWINGS

Example embodiments of the present invention are explained in detail below with reference to the drawings. The figures of the drawings show.

DETAILED DESCRIPTION

Figure 1:
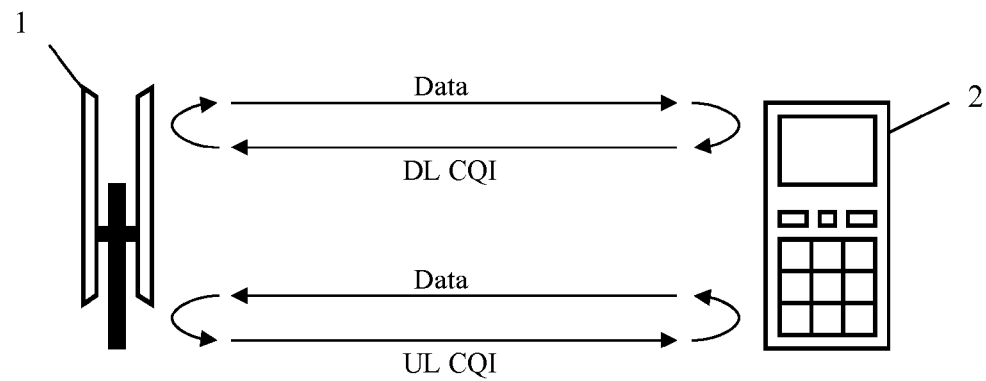
FIG. 1 shows an exemplary communication network.
Figure 2:
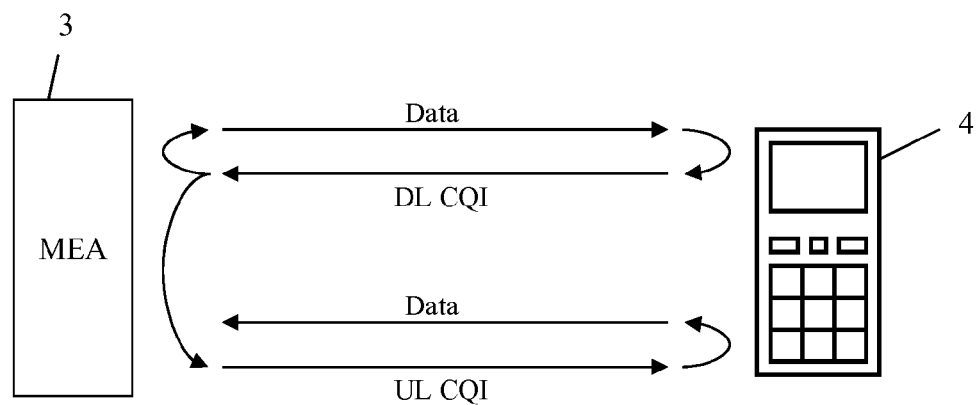
FIG. 2 shows an exemplary embodiment of the inventive measuring device.

First, we demonstrate the underlying principle with respect to FIGS. 1-2. In a second step, the construction and function of an embodiment of the inventive measuring device is shown with respect to FIG. 3. Finally, the function of an embodiment of the inventive measuring method is described along FIG. 4. Similar entities and reference numbers in the different figures have been partially omitted.

In FIG. 1, an exemplary communication network is shown. A base station 1 is in connection to a mobile phone 2. The base station 1 transmits data to the mobile phone 2, which determines a downlink channel quality indicator DL CQI, which corresponds to a quality of the transmission channel from the base station 1 to the mobile phone 2 and transmits it back to the base station 1. Based upon the downlink channel quality indictor DL CQI, the base station 1 adapts certain parameters of the data transmission towards the mobile phone 2. For example, the modulation scheme is adapted.

Moreover, the mobile phone 2 transmits data to the base station 1, which in turn determines an uplink channel quality indicator UL CQI, which corresponds to the quality of the transmission channel from the mobile phone 2 to the base station 1. This uplink channel quality indicator UL CQI again is transmitted to the mobile phone 2, which accordingly adapts its data transmission towards the base station 1.

Also here, for example the modulation scheme, the coding scheme, etc. are adapted to the uplink channel quality indicator transmitted from the base station 1.

In FIG. 2 an embodiment of the inventive measuring device 3 is shown. The measuring device 3 is in contact with a device under test 4, for example a mobile phone. In a laboratory setup, the measuring device 3 and the device under test 4 are connected through cables. Alternatively, the measurement device 3 and the mobile phone 4 are placed in close proximity and connected over the air. Since they are placed in close proximity, this short transmission channel does not significantly impede the transmission.

According to the present invention, the transmission from the measurement device 3 to the device under test 4 corresponds to the transmission of the base station 1 of FIG. 1 to the mobile phone 2 of FIG. 1. The real-world transmission channel, over which the data transmission from the base station 1 to the mobile phone 2 is transmitted, is simulated by performing fading on the transmission from the measurement device 3 to the device under test 4.

As described earlier, performing fading on the transmission channel from the device under test 4 to the measurement device 3 is disadvantageous. Therefore, merely the uplink channel quality UL CQI indicator, indicating the quality of the transmission channel from the device under test 4 to the measurement device 3 but not the entire signal is altered in order to simulate a fading on the uplink channel. The device under test 4 is made to believe that the quality of the transmission channel from the device under test 4 to the measurement device 3 is suboptimal. In the example shown here, the downlink channel quality indicator DL CQI transmitted by the device under test 4 to the measurement device 3 is employed by the measurement device 3 as the uplink channel quality indicator UL CQI, which is transmitted back to the device under test 4. Therefore, the device under test 4 is of the impression that the transmission channel from the device under test 4 to the measurement device 3 is of the exact same quality as the transmission channel from the measurement device 3 to the device under test 4. Alternatively, the measurement device 3 can arbitrarily set the uplink channel quality indictor UL CQI to a pre-specified value. Regarding the construction and the function of the measurement device 3, we further refer to FIG. 3.

Figure 3:
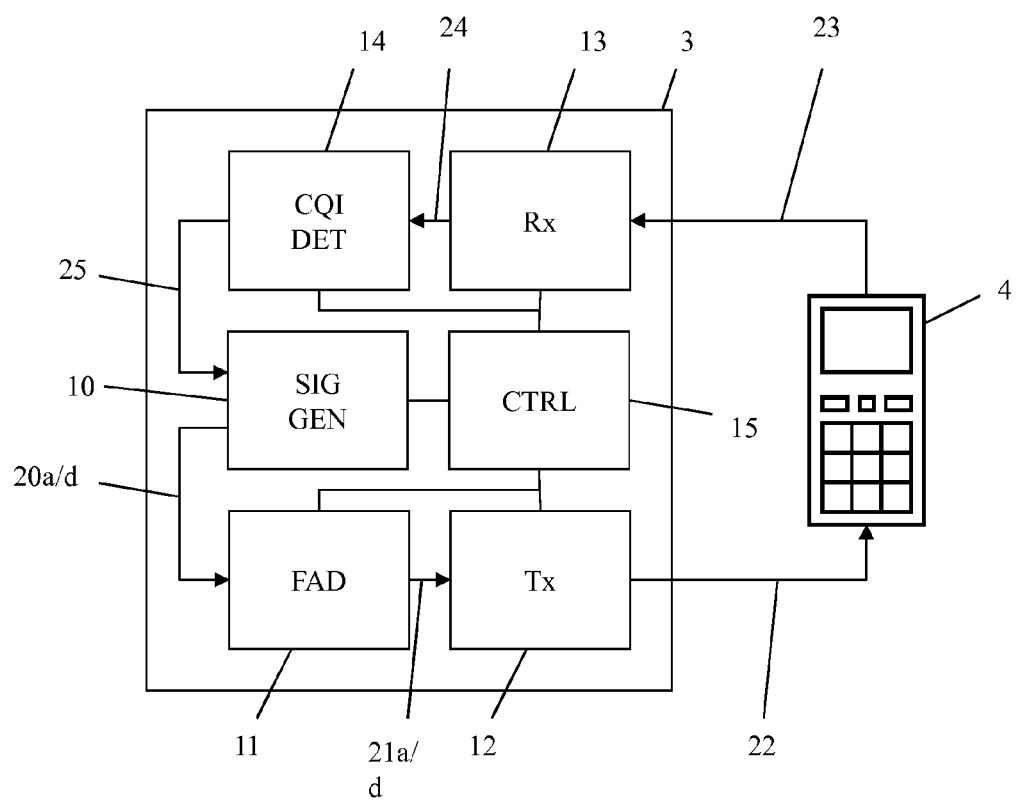
FIG. 3 shows a more detailed diagram of the embodiment of the inventive measuring device.

In FIG. 3, a detailed diagram of the measuring device 3 is shown. The measuring device 3 comprises signal generating means 10 and fading means 11, which are connected to the signal generating means 10. Moreover, it comprises transmission means 12, which are connected to the fading means 11. The transmission means 12 are connected to the device under test 4, which is not part of the measuring device 3. Moreover, the device under test 4 is connected to receiving means 13, which are also part of the measuring device 3. The receiving means 13 are connected to downlink channel quality parameter determination means 14, which are connected to the signal generating means 10.

Moreover, the measuring device 3 comprises control means 15, which are connected to the signal generating means 10, the fading means 11, the transmission means 12, the receiving means 13, and the downlink channel quality parameter determination means 14. The control means 15 are set up for controlling the function of all other components of the measuring device connected to the control means 15. Alternatively, the fading means 11 can be set up in a separate housing, merely connected to the remaining components as indicated through external cables.

When performing a measurement of the reaction of a device under test 4, the signal generating means generate a signal 20*a/d*, which is transmitted to the fading means 11. The signal 20*a/d* is an analog RF-signal 20*a* or a digital baseband signal 20*d*. The fading means performs fading on the signal 20*a/d* and creates a signal 21*a/d*, which is transmitted to the transmission means 12. The signal 21*a/d* is either an analog RF-signal 21*a* or a digital baseband signal 21*d*.

In case of an analog RF-signal 21*a*, the transmission means 12 merely transmits a resulting third signal 22 to the device under test 4. In case of a digital baseband signal 21*d*, the transmission means 12 transforms the digital baseband signal 21*d* into an analog RF-signal 22 and transmits it to the device under test 4.

The signal 20*a/d* generated by the signal generating means 10 comprises an uplink channel quality parameter, which indicates a quality of a transmission channel from the device under test 4 to the measuring device 3. This uplink channel quality parameter corresponds to the uplink channel quality indicator from FIG. 1 or FIG. 2.

The signal generating means 10 sets the uplink channel quality parameter independent from an actual channel quality of the transmission channel from the device under test 4 to the measuring device 3.

The device under test 4 reacts to signal 22 by creating and sending a signal 23 to the measuring device 3. The receiving means 13 receives the signal 23 and determines the reaction of the device under test to the uplink channel quality parameter transmitted to the device under test 4 with the signal 22. For example, the receiving means determine a change of modulation scheme and/or a change of coding scheme and/or a change of packet length and/or a data throughput reached by the device under test 4 and/or a change of a communication standard used by the device under test.

Moreover, the receiving means 13 transmits a signal 24, which corresponds to a digitized version of the signal 23 to the downlink channel quality parameter determination means 14. The downlink channel quality parameter determination means 14 read out from the signal 24 a downlink channel quality parameter generated by the device under test 4 based upon a quality of the transmission channel from the measurement device 3 to the device under test 4. This downlink channel quality parameter is transmitted to the signal generating means 10 as signal 25.

In a first alternative, the signal 20*a/d* generated by the signal generating means 10 is a digital baseband signal 20*d*. The fading means 11 perform the fading digitally on the baseband. Therefore, the resulting signal 21*d* also is a digital baseband signal, which is converted to an analog radio frequency signal 22 by the transmission means 12.

In a second alternative, the signal 20*a/d* generated by the signal generating means 10 is an analog radio frequency signal 20*a*. In this case, the fading means 11 perform analog radio frequency fading on the signal 20*a*. The signal 21*a/d* in this case is a analog radio frequency signal 21*a*. In this case, the transmission means 12 merely transmits the signal 21*a* as signal 22 to the device under test 4.

The uplink channel quality parameter used by the signal generating means 10 can—in a first alternative—be set as the downlink channel quality parameter determined by the downlink channel quality parameter determination means 14. In a second alternative, the signal generating means 10 can set the uplink channel quality parameter arbitrarily, advantageously based upon a preset measuring schedule.

Moreover, the signal generating means 10 can generate the signal 20*a/d* in such a way that the resulting signal 22 indicates to the device under test 4 that at least one data packet of a prior transmission of the device under test 4 was lost. The receiving means 13 are then set up for determining a reaction of the device under test 4 to the lost packet. Especially, the receiving means 13 are then set up for determining when and how often the device under test 4 tries to retransmit the lost packet. Especially, when the simulated channel quality indicated by the downlink channel quality parameter to the device under test 4 has been reduced, since the packet was allegedly lost, the reaction of the device under test 4 is of interest. Since the device under test 4 believes that the channel quality has degraded, it will have to repeat the data that was included within the lost packet using a different modulation scheme and/or coding scheme and/or packet length, etc.

Figure 4:
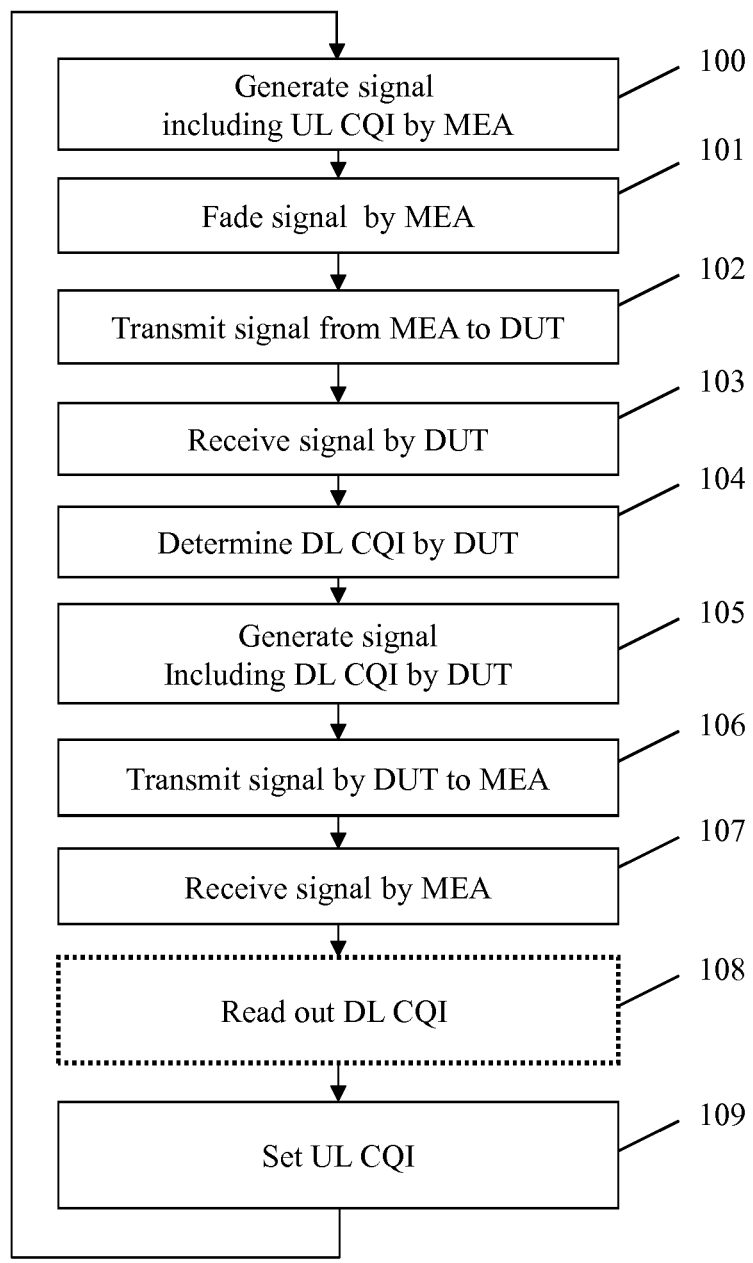
FIG. 4 shows an exemplary embodiment of the inventive measuring method.

In FIG. 4, a float chart of an embodiment of the inventive measurement method is shown. In a first step 100, a signal including an uplink channel quality parameter is generated by a measuring device. In a second step 101, the signal is faded by the measuring device, in a third step 102, the faded signal is transmitted from the measuring device to the device under test. In a fourth step 103, the signal is received by the device under test. In a fifth step 101, the downlink channel quality parameter is determined by the device under test based upon the signal received. This downlink channel quality indicator depends upon the amount of fading introduced in the second step 101.

In a sixth step 105, the device under test generates a signal including the determined downlink channel quality parameter and transmits it to the measuring device in a seventh step 106. In an eighth step 107, the signal is received by the measuring device. In an optional ninth step 108, the downlink channel quality parameter is read out from the signal received by the measuring device 107. Finally, in a tenth step 109, the uplink channel quality parameter is set by the measuring device. In a first alternative, the uplink channel quality parameter is set as the read out downlink channel quality parameter. Alternatively, the uplink channel quality indicator is set arbitrarily, for example based upon a preset measuring schedule. The measurement of the device under test is continued in the first step 100. The uplink channel quality parameter used is the uplink channel quality indicator set in the tenth step 109. These steps are repeated, until all necessary measurements are completed.

The invention is not limited to the examples shown above. Especially, the invention is not limited to a specific communication standard. All communication standards using some sort of channel quality feedback can be used. The invention also can be used with communication standards, which explicitly feed back a parameter indicative of a certain modulation scheme, etc. to be used for further transmissions, as for example GSM. This parameter corresponds to the channel quality parameter as well. The characteristics of the exemplary embodiments can be used in any advantageous combinations.

The invention claimed is:

1. A measuring device, comprising:
    a signal generator configured to generate a first signal that includes an uplink channel quality parameter indicating a quality of a transmission channel from a device under test to the measuring device, and to set the uplink channel quality parameter independent of actual channel quality of the transmission channel from the device under test to the measuring device;
    a fader configured to perform a fading of the first signal;
    a transmitter configured to transmit a downlink signal to the device under test, wherein the downlink signal is based on a result of the fading of first signal;

a receiver configured to receive an uplink signal from the device under test, wherein the uplink signal is based on the uplink channel quality parameter, and includes a downlink channel quality parameter generated by the device under test based on a quality of the downlink signal transmitted to the device under test; and a processor configured to determine, based on the uplink signal, a reaction of the device under test to the uplink channel quality parameter, and the downlink channel quality parameter; and wherein the signal generator is configured to set the uplink channel quality parameter as being equal to the received downlink channel quality parameter.

2. The measuring device according to claim 1, wherein the reaction of the device under test to the uplink channel quality parameter comprises one or more of a change of modulation scheme, a change of coding scheme, a change of packet length, a data throughput reached by the device under test, and a change of a communication standard used by the device under test.

3. The measuring device according to claim 1, wherein the first signal is an analog high frequency signal, and wherein the transmitter is configured to receive an analog second signal derived from the first signal, and to transmit the analog second signal as the downlink signal.

4. The measuring device according to claim 1, wherein the first signal is a digital signal, and wherein the transmitter is configured to receive a digital second signal derived from the first signal, to convert the digital second signal into an analog signal, and to transmit the converted analog signal as the downlink signal.

5. The measuring device according to claim 1, wherein the signal generator is configured to generate the first signal such that it indicates to the device under test that at least one packet of a prior transmission of the device under test was lost, and wherein the receiver is configured to determine a reaction of the device under test to the at least one lost packet.

6. The measuring device according to claim 1, wherein the signal generator is configured to set the uplink channel quality parameter to a pre-determined value.

7. A method comprising:

generating a first signal that includes an uplink channel quality parameter indicating a quality of a transmission channel from a device under test to a measuring device, wherein the uplink channel quality parameter is independent of actual channel quality of the transmission channel from the device under test to the measuring device;

performing a fading of the first signal;

transmitting a downlink signal to the device under test, wherein the downlink signal is based on the faded first signal;

receiving an uplink signal from the device under test, wherein the uplink signal is based on the uplink channel quality parameter, and includes a downlink channel quality parameter generated by the device under test based on a quality of the downlink signal transmitted to the device under test; and determining, based on the uplink signal, a reaction of the device under test to the uplink channel quality parameter, and the downlink channel quality parameter; and wherein the uplink channel quality parameter is set as being equal to the received downlink channel quality parameter.

8. The method according to claim 7, wherein the reaction of the device under test to the uplink channel quality parameter comprises one or more of a change of modulation scheme, a change of coding scheme, a change of packet length, a data throughput reached by the device under test, and a change of a communication standard used by the device under test.

9. The method according to claim 7, wherein the first signal is an analog high frequency signal, and wherein the method further comprises:

deriving an analog second signal based on the first signal; and transmitting the analog second signal as the downlink signal.

10. The method according to claim 7, wherein the first signal is a digital signal, and wherein the method further comprises:

deriving a digital second signal from the first signal;

converting the digital second signal into an analog signal; and transmitting the analog signal as the downlink signal.

11. The method according to claim 7, wherein the first signal is generated such that it indicates to the device under test that at least on packet of a prior transmission of the device under test was lost, and wherein the method further comprises a determination of a reaction of the device under test to the at least one lost packet.

12. The method according to claim 7, wherein the uplink channel quality parameter is set to a pre-determined value.

* * * * *